Feb. 9, 1971 W. E. SOHL 3,562,366

METHOD OF REPAIRING WINDSHIELDS

Filed Dec. 18, 1968

INVENTOR.
WILLIAM E. SOHL
BY Kinney, Alexander,
Sell, Steldt & DeLa Hunt
ATTORNEYS 3,562,366
METHOD OF REPAIRING WINDSHIELDS
William E. Sohl, Landau, Ontario, Canada, assignor to Minnesota Mining and Manufacturing Company, St. Paul, Minn., a corporation of Delaware
Filed Dec. 18, 1968, Ser. No. 784,732
Int. Cl. B29c 27/04
U.S. Cl. 264—23    4 Claims

ABSTRACT OF THE DISCLOSURE

Pock marks in automotive windshields are extinguished by completely filling with liquid resin under high frequency vibration and polymerizing the resin, all while leaving the windshield in place.

Figure 1:
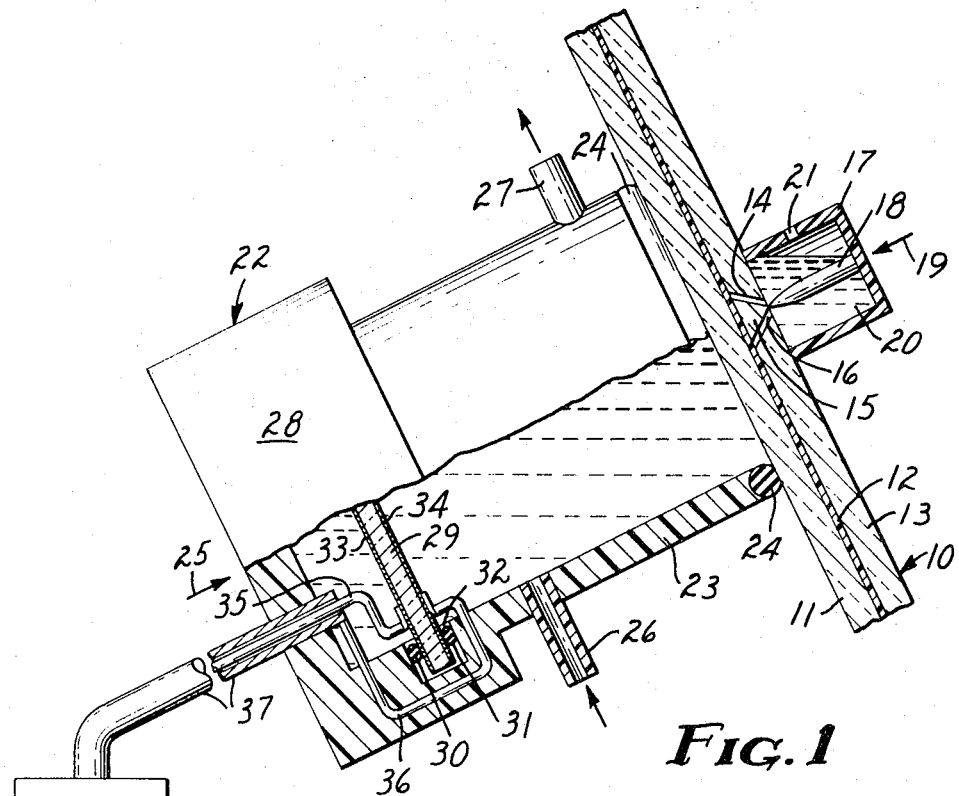

This invention relates to the repairing of glass laminates, of which automotive windshields are a prime example.

Owners and operators of automobiles are frequently distressed by pock-marked windshields, such as are caused by impact of rocks picked up from the road way by another vehicle. Besides interfering with the operator's view, such marks detract substantially from the value of the vehicle. Replacement of the windshield is expensive and time-consuming and in many cases results in improper sealing and in subsequent leakage.

It has now been found possible to repair windshields as well as other glass plate laminates marked in such manner. The hole or recess formed in the glass is completely filled with transparent polymer which is then smoothed and polished to the contour of the original surface. The entire process is accomplished in surprisingly short time and, most significantly, while the windshield remains in place in the automobile.

Figure 2:
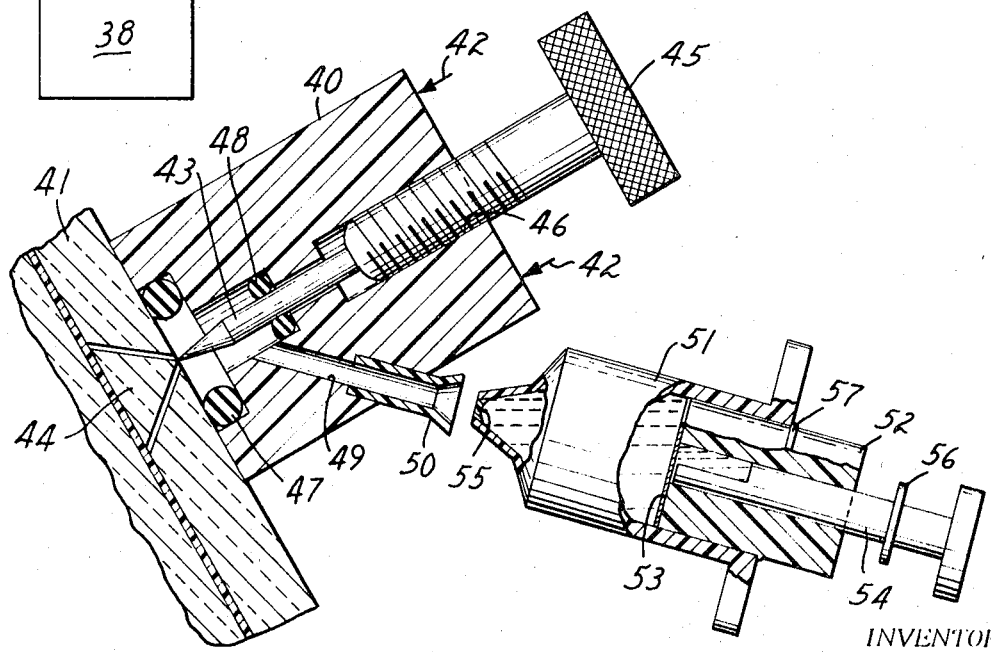

In the drawing,

FIG. 1 illustrates in partial section one form of apparatus in position against a damaged windshield, and FIG. 2 illustrates an alternative resin-applying apparatus.

The form of apparatus illustrated in FIG. 1 is shown in position on a windshield 10 consisting of an inner pane of glass 11, an intermediate plastic bonding and reinforcing layer 12, and an outer pane of glass 13, the later being pock-marked with a conical recess 14 still containing a conical segment 15 bonded at its base to the layer 12. The opening 16 between the inner cone and the surrounding glass provides a light-diffracting glass-air interface.

A resilient cup 17 centrally supporting a rigid pointed probe 18 is placed over the defect with the edges of the cup pressed tightly against the surface of the plane 13 and with the tip of the probe against the tip of the cone 15. Pressure is applied against the assembly as indicated by the arrow 19, and a fluid hardenable transparent resin composition 20 is added to the cup through a suitable opening 21. The resin flows into the opening 16 but is unable to penetrate to any significant depth due to the narrowness of the opening and to the residual air retained therein.

Against the opposite surface of the windshield there is placed a vibratory apparatus 22. The apparatus consists of a cup-like housing 23 fitted at the rim with a compressible ring gasket 24. It is pressed firmly against the glass by a force indicated by arrow 25. Water enters the hollow interior of the housing through tap 26 and is expelled through tap 27.

Within the enlarged head 28 of the housing 23 is contained a crystal disc 29 shown supported by opposing O-rings 30, 31 within a groove 32. The disc 29 is coated over both flat surfaces with thin conductive coatings 33, 34 which are connected by leads 35, 36 to a coaxial cable 37 and thereby to a high frequency electrical oscillator 38.

With the apparatus in position as described and illustrated, ultrasonic energy is fed from the oscillator to the crystal, preferably in a series of short bursts. The vibrations thereby set up in the crystal are transmitted through the column of water to the glass. The entrapped air within the space 16 is completely replaced by the liquid resin composition. The water is then drawn off, the vibratory apparatus removed, and the resin is induced to polymerize. As soon as it has hardened sufficiently, the cup 17 with the unused resin is removed, for example by slicing with a heated knife or razor blade along the surface of the pane 13. After further hardening if desired, the surface of the windshield is smoothed out by buffing.

Both the cup 17 and the vibrator 22 may conveniently be held against the glass by spring-loaded frames supported from suction cups applied to the same glass surface. The probe 18 may extend through the resilient bottom of the cup 17 and may then be separately forced against the cone 15 during entry of resin and separately removed from contact with the cone during polymerization. Pre-filled and hermetically sealed cups may serve both as resin storage means and as applicator means, being opened along predetermined lines just prior to placing over the recessed pane.

Insonator apparatus, for supplying supersonic vibrations to a liquid column substantially as herein described, is known to the art. Frequencies of from 25 to 850 kilohertz are readily obtained. An exemplary apparatus, available from Macrosonics Corporation of Cateret, N.J., provides a nominal output of 250 watts at frequencies of 800 to 1000 kilohertz. In some instances it may be found convenient to cover the open end of the vibrator 22 with a water-retaining flexible rubber dam or diaphragm; in such cases it is usually desirable to dampen the glass and diaphragm surfaces to avoid entrapment of air and cushioning of vibrational energy.

Much of the energy supplied by the vibrator becomes converted to heat, and a brisk flow of cooling water through the device is required in order to prevent overheating. For the same reason it is usually preferable to operate the vibrator discontinuously, i.e. in short bursts of not longer than a few seconds each.

In some instances it may be found desirable to prefill the opening 16 with a replaceable liquid, such for example as hexane, which is then subsequently replaced by the heavier or more viscous resinous liquid. The technique provides an excellent method of introducing an adhesive priming material for assuring permanent strong bonding between the glass surfaces and the subsequently applied and hardened resin. Organic silanes are particularly useful for such purposes.

FIG. 2 illustrates an alternative form of resin-applying apparatus wherein the liquid resin is applied under pressure. The device comprises a close-fitting hollow open-ended block 40 which is held firmly against the surface of the windshield 41 by pressure indicated by arrows 42. A threaded pointed probe 43 is pressed against the tip of the glass cone 44, pressure being exerted by rotation of handle 45. Close-fitting O-rings 47 and 48 prevent loss of resin both at the glass surface and along the probe.

A side channel 49 leads to a socket 50 into which is fitted the perforated tip of a syringe 51. The body of the syringe initially is partially filled with the liquid resin in an inert atmosphere, while the catalyst is contained within the hollow tube 52 and protected by a foil 53. Pressure on the plunger 54 bursts the foil and forces the catalyst into the resin, and the two are mixed by shaking. The tip 55 is then perforated and inserted into the socket 50. Further pressure on the plunger then forces the flange 56 against the tube 52 and the latter into the body 51, the ring-like land 57 serving as a further seal against the inner wall. After filling the recess in the windshield and before the resin has cured, the block 40 is removed and cleaned for subsequent use, the emptied syringe 51 being discarded. A small excess of the resin mixture is permitted to remain at the surface of the windshield to take care of any shrinkage, and the resin is permitted to cure. The surface is then conformed and polished. The syringe serves as a convenient source of precisely proportioned polymerizable liquid as well as a means for applying the same under pressure in the repairing of windshields.

The following examples, in which all proportions are in parts by weight unless otherwise specified, will serve further to illustrate the practice of the invention.

EXAMPLE 1

| | Parts |
|---|---|
| Polyester acrylic resin mixture | 7 |
| Methyl methacrylate | 3 |
| Benzoyl peroxide | .030 |
| Benzoin | 0.15 |
| Coupling agent (vinyl methoxy silane) | .025 |
| Preservative (optional) | .001 |

The polyester acrylic resin mixture contains 30 parts of methyl methacrylate monomer and 70 parts of polyester resin having an acid number of 25 and formed by condensation of a mixture of 1.75 mols o-phthalic anhydride, 1.0 mol maleic anhydride, and 2.75 mols of propylene glycol. Diethylene glycol may be substituted for the propylene glycol, and styrene may be substituted for a minor proportion of the methyl methacrylate. The vinyl methoxy silane is further identified as the methacrylic acid ester of hydroxypropyl trimethoxysilane. Hydroquinone and t-butyl phenol are useful as preservatives but may be omitted where prolonged storage is not required.

The solution is degassed under 50 mm. Hg pressure and is applied to the damaged windshield from a vinyl plastic cup 17 measuring .5 inch in diameter by .7 inch in length. The vibrator 22 is operated at 850 kilohertz and at 13.0 thermal watts per sq. cm. of crystal, and in a series of 30-second bursts separated by rest periods of equal duration. Complete filling is achieved within 5 minutes as observed by visual inspection.

After bringing the assembly to room temperature, the cup, contents, and surrounding windshield area are exposed to the strong ultraviolet radiation of a GE H 250–A37–5 mercury vapor arc lamp until polymerization is substantially complete. The cup and excess polymer is stripped and cut away and the conformed surface is polished by buffing with metal polish. The location of the repair cannot be visibly determined.

The resin may alternatively be supplied under moderate pressure, for example at up to about 50 p.s.i., using a pressure-gun as described in connection with FIG. 2 and applying both pressure and vibration on a 10 second on, 10 second off, schedule.

Another resin mixture which is equally effective under the same conditions is composed of:

| | |
|---|---|
| Bis-allyl diglycol carbonate | 10 |
| Benzoyl peroxide | .30 |
| Benzoin | .15 |
| Coupling agent (as above) | .025 |

Still another resin mixture is prepared of 10 parts of room-temperature-vulcanizing liquid dimethyl silicone resin and .01 part of amine catalyst, and the resin is applied as in Example 1 and permitted to cure for 5 hours at 75° F. The refractive index of the hardened resin is 1.42 whereas that of the glass is 1.52. The repair is invisible when viewed from a point normal thereto but may be dimly seen when viewed from an oblique angle.

EXAMPLE 2

The apparatus as described hereinbefore but with a separately removable rigid probe or pressure-pin is placed in position and the cup is first filled with a solution of .03 part of vinyl methoxysilane in 10 parts of n-hexane. The vibrator 22 is operated at 850 kHz and 5.5 thermal watts/sq. cm. on a cycle of 10 seconds on, 10 seconds off, for three minutes. Surplus solution is removed from the cup and replaced with a solution of .02 part methylethylketone peroxide in 10 parts of a 70–25–5 polyester-methylmethacrylate-styrene mixture as identified in Example 1. Ultrasonic energy at 850 kHz and 13.0 watts/sq. cm. is applied at a 15 seconds on, 15 seconds off cycle for three minutes. Curing is permitted to proceed at room temperature (75° F.) for 18 hours, the pressure-pin being withdrawn after the first few minutes. The repaired area is trimmed and polished with results as in Example 1.

Similar results are obtained by substituting for the polyester-styrene mixture a mixture containing 9 parts of bis-phenol A diglycidyl ether (epoxy equivalent 185–195), one part of butyl glycidyl ether, and 2.5 parts epoxy hardener such for example as the reaction product of equal mol proportions of butyl glycidyl ether and diethylene triamine. However the epoxy resins are found to interact slowly with the polyvinyl butyral normally employed as the plastic bonding layer 12, with slight but noticeable discoloration, and are therefore not preferred for repairing of windshields containing such layers.

In addition to the several specific resin compositions given in the foregoing examples, other resinous or polymer-forming materials of a wide variety may be used. For best results the material should be a thin liquid at room temperature and polymerize to a hard transparent solid having substantially the same refractive index as the glass, preferably within ±.02 unit thereof. In addition the resin should adhere well to the glass and should be resistant to discoloration and weathering. Materials which polymerize by addition polymerization without splitting out of difficultly removable volatile by-products are preferred, and the more weather-resistant aliphatic resins are generally preferred over those with an aromatic content. Urethanes, epoxies, acrylates and methacrylates have all been found useful.

What is claimed is as follows:

1. The method of repairing a pock-marked glass plate laminate comprising supplying at the pock-marked area a quantity of liquid polymerizable resin composition while subjecting said area to supersonic vibration applied in a series of spaced short bursts, said vibration being sufficient to cause total filling of the open portions of said area with said resin; permitting said resin to harden; and polishing the surface into conformity with the surrounding portions of said plate.

2. The method of repairing a pock-marked glass plate laminate comprising supplying at the pock-marked area a quantity of liquid resin composition which is polymerizable under the influence of actinic radiation while subjecting said area to supersonic vibration, sufficient to cause total filling of the open portions of said area with said resin; polymerizing said resin by exposure to actinic radiation; and polishing the surface into conformity with the surrounding portions of said plate.

3. The method of repairing a pock-marked glass plate laminate comprising filling the open portions of the pockmarked area with a volatile thin liquid, replacing the thin liquid with a liquid polymerizable resin while subjecting said area to supersonic vibration, sufficient to cause total filling of the open portions of said area with said resin; permitting said resin to harden; and polishing the surface into conformity with the surrounding portions of said plate.

4. The method of claim 3 wherein said volatile liquid contains a priming agent for improving the bond of said resin to said glass.

References Cited

UNITED STATES PATENTS

| | | | |
|---|---|---|---|
| 3,246,055 | 4/1966 | Pendleton | 264—23 |
| 2,337,792 | 12/1943 | Yokell | 18—Patching |

ROBERT F. WHITE, Primary Examiner

R. H. SHEAR, Assistant Examiner

U.S. Cl. X.R.

264—36, 71, 162